United States Patent
Okabayashi et al.

(10) Patent No.: US 10,760,502 B2
(45) Date of Patent: Sep. 1, 2020

(54) LUBRICITY ESTIMATION DEVICE AND FUEL SUPPLY CONTROL DEVICE

(71) Applicant: DENSO CORPORATION, Kariya, Aichi-pref. (JP)

(72) Inventors: Atsunori Okabayashi, Kariya (JP); Shinya Hoshi, Kariya (JP)

(73) Assignee: DENSO CORPORATION, Kariya (JP)

( * ) Notice: Subject to any disclaimer, the term of this patent is extended or adjusted under 35 U.S.C. 154(b) by 70 days.

(21) Appl. No.: 15/773,575

(22) PCT Filed: Oct. 18, 2016

(86) PCT No.: PCT/JP2016/080762
§ 371 (c)(1),
(2) Date: May 4, 2018

(87) PCT Pub. No.: WO2017/081992
PCT Pub. Date: May 18, 2017

(65) Prior Publication Data
US 2018/0320602 A1 Nov. 8, 2018

(30) Foreign Application Priority Data
Nov. 12, 2015 (JP) ................................. 2015-222314

(51) Int. Cl.
*F02D 1/02* (2006.01)
*F02D 35/02* (2006.01)
(Continued)

(52) U.S. Cl.
CPC ............. *F02D 1/02* (2013.01); *F02D 19/029* (2013.01); *F02D 19/0634* (2013.01);
(Continued)

(58) Field of Classification Search
CPC .... F02D 1/02; F02D 41/38; F02D 2200/0611; F02D 2041/389; F02D 35/028;
(Continued)

(56) References Cited

U.S. PATENT DOCUMENTS

2005/0217638 A1* 10/2005 Kaneko ................. F02M 25/00
123/294
2012/0186236 A1* 7/2012 Aoki ....................... F01N 3/035
60/286

(Continued)

FOREIGN PATENT DOCUMENTS

JP 62-158917 7/1987
JP 62158917 A * 7/1987
(Continued)

OTHER PUBLICATIONS

U.S. Appl. No. 15/773,588 of Okabayashi, et al., filed May 4, 2018, entitled Deposit Estimation Device and Combustion System Control Device, (51 pages).
(Continued)

*Primary Examiner* — Joseph J Dallo
*Assistant Examiner* — Scott A Reinbold
(74) *Attorney, Agent, or Firm* — Nixon & Vanderhye PC

(57) ABSTRACT

A lubricity estimation device is applied to a fuel supply system that supplies a fuel to an internal combustion engine, and includes a mixing ratio estimation unit and a lubrication index calculation unit. The mixing ratio estimation unit estimates the mixing ratio of each of plural types of molecular structures included in the fuel. The lubrication index calculation unit calculates a lubrication index, representing the lubricity of an outer peripheral portion S1 of the piston of a fuel pump and an outer peripheral portion of the valve body of a fuel injection valve by the fuel, based on the mixing ratio estimated by the mixing ratio estimation unit.

23 Claims, 5 Drawing Sheets

(51) Int. Cl.
*F02D 19/06* (2006.01)
*F02D 41/00* (2006.01)
*F02D 19/02* (2006.01)
*F02M 59/44* (2006.01)
*F02D 41/38* (2006.01)
*F02D 41/22* (2006.01)
*F02M 63/02* (2006.01)
*F02M 63/00* (2006.01)

(52) U.S. Cl.
CPC ......... *F02D 35/023* (2013.01); *F02D 35/028* (2013.01); *F02D 41/0025* (2013.01); *F02D 41/22* (2013.01); *F02D 41/38* (2013.01); *F02D 41/3845* (2013.01); *F02M 59/447* (2013.01); *F02M 63/0225* (2013.01); *F02D 2041/224* (2013.01); *F02D 2041/389* (2013.01); *F02D 2200/0606* (2013.01); *F02D 2200/0611* (2013.01); *F02D 2200/0612* (2013.01); *F02M 63/0001* (2013.01); *F02M 2200/02* (2013.01)

(58) Field of Classification Search
CPC ............... F02D 35/023; F02D 41/0025; F02D 19/0634; F02D 19/029; F02D 41/3845; F02D 41/22; F02D 2200/0606; F02D 2200/0612; F02D 2041/224; F02M 63/0225; F02M 59/447; F02M 63/0001; F02M 2200/02
USPC ....................................................... 123/446
See application file for complete search history.

(56) References Cited

U.S. PATENT DOCUMENTS

2013/0298872 A1* 11/2013 Kojima ............... F02D 41/0025
                                                    123/446
2014/0051899 A1* 2/2014 Hoizoe .................. C10G 21/14
                                                    585/310
2016/0363074 A1    12/2016  Hoshi et al.
2016/0363080 A1    12/2016  Okabayashi et al.
2016/0363084 A1    12/2016  Hoshi et al.

FOREIGN PATENT DOCUMENTS

| JP | 9-287540 | | 11/1997 | |
| JP | 09287540 | A * | 11/1997 | |
| JP | 01/44411 | | 6/2001 | |
| JP | 2008-161864 | | 7/2008 | |
| JP | 2008161864 | A * | 7/2008 | ............ C02F 1/005 |
| JP | 2009-138665 | | 6/2009 | |
| JP | 2010-169549 | | 8/2010 | |
| JP | 2011-184672 | | 9/2011 | |
| JP | 2011184672 | A * | 9/2011 | |
| JP | 2013-24138 | | 2/2013 | |
| JP | 2014-148906 | | 8/2014 | |
| WO | WO-0144411 | A2 * | 6/2001 | ............... C10L 1/08 |
| WO | 2017/081993 | | 5/2017 | |
| WO | 2017/081994 | | 5/2017 | |
| WO | 2017/090307 | | 6/2017 | |
| WO | 2017/090404 | | 6/2017 | |

OTHER PUBLICATIONS

U.S. Appl. No. 15/773,607 of Okabayashi, et al., filed May 4, 2018, entitled Smoke Amount Estimation Device and Combustion System Control Device, (50 pages).

U.S. Appl. No. 15/763,602 of Okabayashi, et al., filed Mar. 28, 2018, entitled Sensor Failure Diagnostic Apparatus, (55 pages).

U.S. Appl. No. 15/774,404 of Hoshi, et al., filed May 8, 2018, entitled, (68 pages), entitled: Combustion System Control Device.

* cited by examiner

FIG. 4
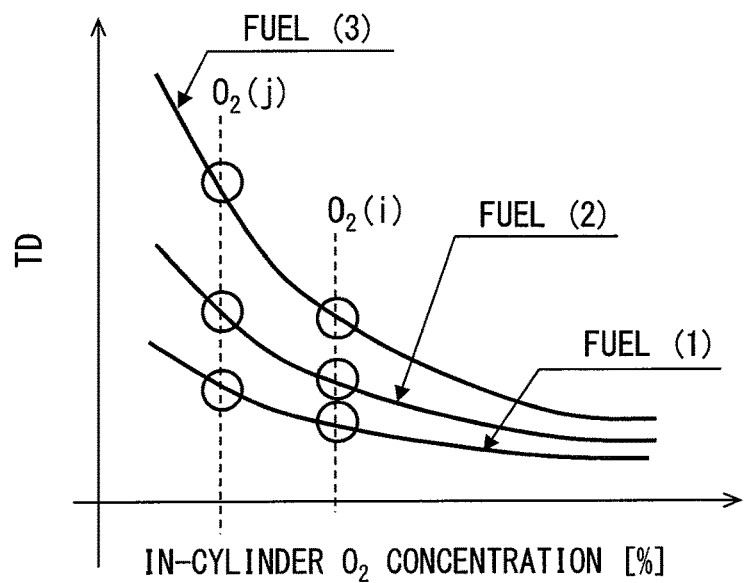
FIG. 5
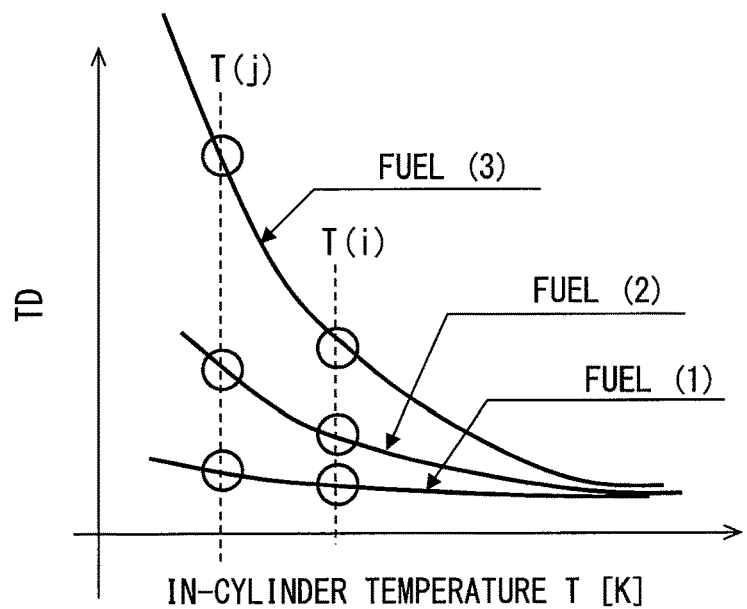
FIG. 6
| | MOLECULAR STRUCTURE SPECIES A | MOLECULAR STRUCTURE SPECIES B | MOLECULAR STRUCTURE SPECIES C |
|---|---|---|---|
| FUEL (1) | LARGE | LARGE | SMALL |
| FUEL (2) | SMALL | LARGE | SMALL |
| FUEL (3) | LARGE | SMALL | LARGE | ary
LUBRICITY ESTIMATION DEVICE AND FUEL SUPPLY CONTROL DEVICE

This application is the U.S. national phase of International Application No. PCT/JP2016/080762 filed Oct. 18, 2016 which designated the U.S. and claims priority to Japanese Patent Application No. 2015-222314 filed on Nov. 12, 2015, the entire contents of each of which are incorporated herein by reference.

CROSS REFERENCE TO RELATED APPLICATION

This application is based on Japanese Patent Application No. 2015-222314 filed on Nov. 12, 2015, the disclosure of which is incorporated herein by reference.

TECHNICAL FIELD

The present disclosure relates to both a lubricity estimation device that estimates the lubricity of a sliding portion of a fuel supply system by a fuel and a fuel supply control device that controls the operation of the fuel supply system by using the lubricity estimation device.

BACKGROUND ART

A fuel supply system is known, which includes both a fuel injection valve that injects a fuel to be burned in an internal combustion engine and a fuel pump that pumps the fuel to the fuel injection valve. The fuel supply system has sliding portions that slide while being exposed to the fuel, such as, for example, a sliding portion of the fuel pump and a sliding portion of the fuel injection valve, and in such sliding portions, the fuel functions as a lubricant. Therefore, if a fuel having low lubricity is used, there is a high risk that either or both of the sliding portions may be damaged, which may result in a sliding failure.

The fuel having low lubricity is one having a low retention property to a sliding portion, such as, for example, a fuel having a low dynamic viscosity. Patent Document 1 discloses a dynamic viscosity sensor that detects the dynamic viscosity of a fuel, and it can be estimated that as the dynamic viscosity thus detected is lower, a fuel has lower lubricity.

A fuel contains components having plural types of molecular structures, such as components having molecular structures of aromas and components having molecular structures of paraffins. The mixing ratios of these components differ depending on the mining location, refinery location, and the like of fuels. When fuels are compared with each other at such a molecular structure level, lubricity may differ when the mixing ratio of each molecular structure species differs, even if the detected dynamic viscosities are equal to each other. Therefore, when it is intended to estimate lubricity from the dynamic viscosity detected by a dynamic viscosity sensor, there is a limit in improving the estimation accuracy.

RELATED ART DOCUMENT

Patent Document

PATENT DOCUMENT 1: JP 2013-24138 A

SUMMARY OF INVENTION

An object of the present disclosure is to provide a lubricity estimation device and a fuel supply control device that can estimate with high accuracy the lubricity of a sliding portion by a fuel.

According to one embodiment of the present disclosure, the lubricity estimation device is applied to a fuel supply system that supplies a fuel to an internal combustion engine, and includes: a mixing ratio estimation unit that estimates a mixing ratio of each of plural types of molecular structures contained in the fuel; and a lubrication index calculation unit that calculates a lubrication index, representing lubricity of a sliding portion of the fuel supply system by the fuel, based on the mixing ratio estimated by the mixing ratio estimation unit.

According to another embodiment of the present disclosure, the fuel supply control device controls operation of a fuel supply system having both a fuel injection valve that injects a fuel to be burned in an internal combustion engine and a fuel pump that pumps the fuel to the fuel injection valve. The fuel supply control device includes: a mixing ratio estimation unit that estimates a mixing ratio of each of plural types of molecular structures contained in the fuel; a lubrication index calculation unit that calculates a lubrication index, representing lubricity of a sliding portion of the fuel supply system by the fuel, based on the mixing ratio estimated by the mixing ratio estimation unit; and a protection control unit that protects, when the lubricity becomes low with the lubrication index calculated by the lubrication index calculation unit exceeding a predetermined threshold value, the sliding portion by controlling the operation of the fuel supply system so as to reduce the workload of the fuel pump.

According to the one embodiment, a lubrication index, that is, the lubricity of a sliding portion by a fuel is estimated based on the mixing ratio of each of plural types of molecular structures contained in the fuel. Therefore, the lubricity can be estimated with higher accuracy than in the case where the lubricity is estimated based on, for example, the dynamic viscosity detected by a dynamic viscosity sensor.

Further, according to the other embodiment, the workload of the fuel pump is reduced when the lubrication index becomes low beyond a predetermined threshold value, and hence the sliding speed in the sliding portion of the fuel pump reduces, whereby the sliding portion is protected. Also, with a reduction in the workload of the fuel pump, the pressure of the fuel to be pumped from the fuel pump reduces. Then, the temperature of the fuel lowers, and hence the dynamic viscosity lowers, and as a result, the lubricity improves, whereby the sliding portion is protected. Therefore, a sliding failure, which may occur when a fuel having low lubricity is used, can be suppressed from occurring.

BRIEF DESCRIPTION OF DRAWINGS

The above and other objects, characteristics, and advantages of the present disclosure will become more apparent from the following detailed description with reference to the accompanying drawings:

FIG. 4 is a view showing a relationship between a property line representing a change in the ignition delay time caused due to an in-cylinder oxygen concentration and the molecular structure species of fuel;

FIG. 5 is a view showing a relationship between a property line representing a change in the ignition delay time caused due to an in-cylinder temperature and the molecular structure species of fuel;

FIG. 6 is a view showing a relationship between a property line specified based on an ignition delay time and the mixing ratio of a molecular structure species;

DESCRIPTION OF EMBODIMENTS

Figure 1:
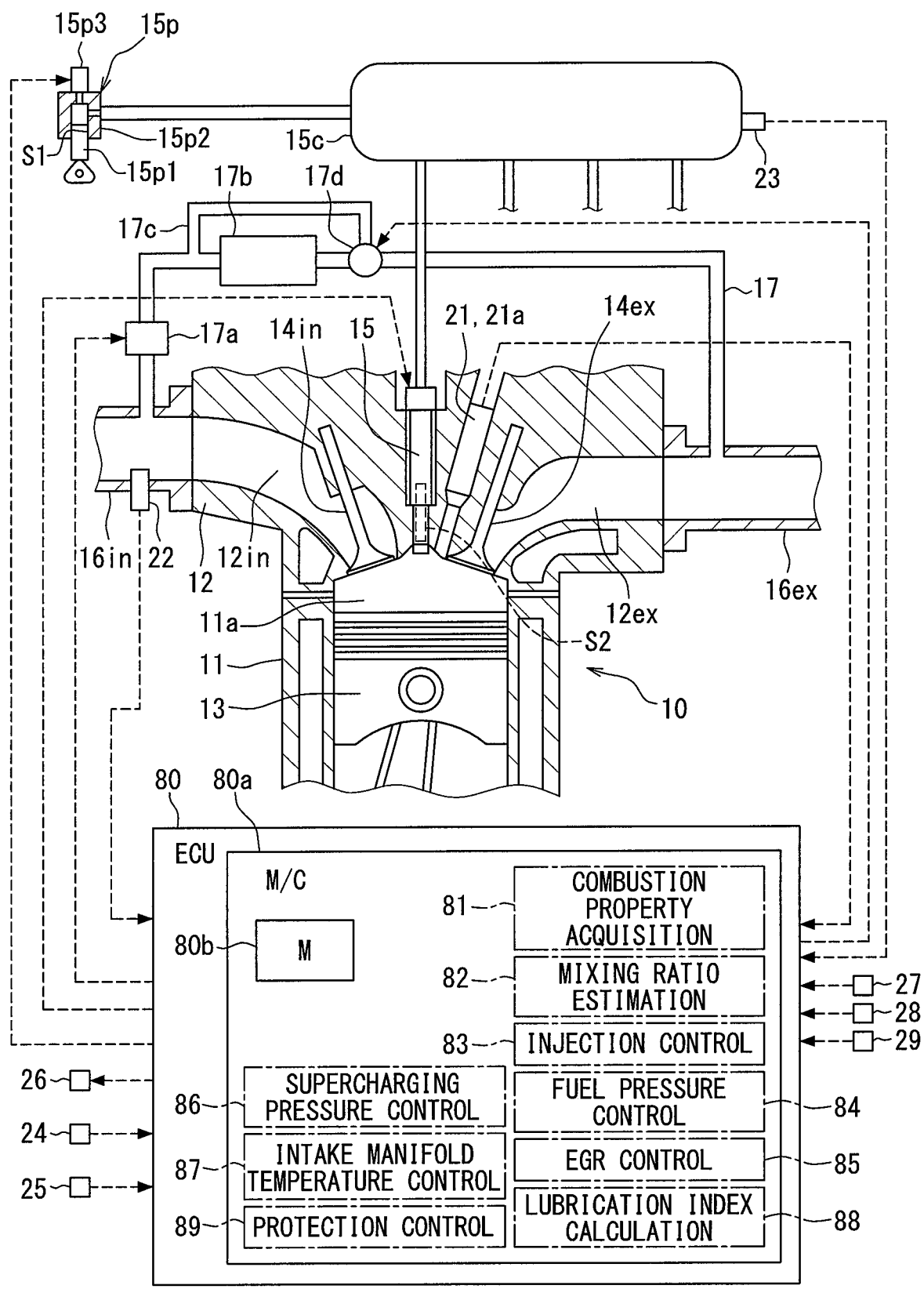
FIG. 1 is a view for explaining a fuel supply control device according to a first embodiment of the disclosure and a combustion system of an internal combustion engine to which the device is applied.

Hereinafter, a plurality of embodiments for carrying out the invention will be described with reference to the views. In each embodiment, parts corresponding to the items described in the preceding embodiment are denoted by the same reference numerals, and duplicated description may be omitted. In each embodiment, when only part of a configuration is described, the previously described other embodiments can be referred to and applied to the other parts of the configuration.

First Embodiment

A fuel supply control device according to the present embodiment is provided by an electronic control unit (ECU) 80 shown in FIG. 1. The ECU 80 includes a microcomputer 80a, an unshown input processing circuit and an output processing circuit, and the like. The microcomputer 80a includes an unshown central processing unit (CPU) and a memory 80b. With the CPU executing a predetermined program stored in the memory 80b, the microcomputer 80a controls the operations of a fuel injection valve 15, a fuel pump 15p, an EGR valve 17a, a temperature control valve 17d, a supercharging pressure regulator 26, and the like, which are included in a combustion system. Through these controls, the combustion state of an internal combustion engine 10 included in the combustion system is controlled to be a desired state. The combustion system and the ECU 80 are mounted in a vehicle, and the vehicle travels by using the output of the internal combustion engine 10 as a driving source.

An internal combustion engine 10 includes a cylinder block 11, a cylinder head 12, a piston 13, and the like. An intake valve 14in, an exhaust valve 14ex, a fuel injection valve 15, and an in-cylinder pressure sensor 21 are attached to the cylinder head 12. A density sensor 27 for detecting the density of a fuel, a dynamic viscosity sensor 28 for detecting the dynamic viscosity of a fuel, and a fuel temperature sensor 29 for detecting the temperature of a fuel are attached to the portion forming a fuel passage such as a common rail 15c or to a fuel tank.

A fuel pump 15p pumps the fuel in the fuel tank to the common rail 15c. With an ECU 80 controlling the operation of the fuel pump 15p, the fuel in the common rail 15c is stored in the common rail 15c in a state where the pressure of the fuel is maintained at a target pressure Ptrg. The target pressure Ptrg is set based on the load and the engine rotation number of the internal combustion engine 10. For example, as the load and the engine rotation number are higher, the target pressure Ptrg is set to a higher value. However, the target pressure Ptrg is set not to exceed a preset upper limit value.

The common rail 15c distributes the accumulated fuel to the fuel injection valve 15 of each cylinder. The fuel injected from the fuel injection valve 15 mixes with intake air in a combustion chamber 11a to form an air-fuel mixture, and the air-fuel mixture is compressed by the piston 13 and self-ignites. In short, the internal combustion engine 10 is a compression self-ignition type diesel engine, and light oil is used as the fuel.

The fuel injection valve 15 is configured to accommodate, in the body, an electromagnetic actuator and a valve body. When the ECU 80 powers on the electromagnetic actuator, the electromagnetic attraction force of the electromagnetic actuator opens a leak passage of an unshown back pressure chamber, and the valve body opens with a decrease in back pressure and an injection hole formed in the body is opened, whereby a fuel is injected from the injection hole. When the electromagnetic actuator is powered off, the valve body closes, whereby the fuel injection is stopped.

In the combustion system, the system of a part for supplying a fuel to the internal combustion engine 10 is referred to as a fuel supply system. The fuel supply system includes at least the fuel pump 15p, the common rail 15c, and the fuel injection valve 15. In addition, the fuel supply system according to the present embodiment includes pipes connecting the fuel pump 15p, the common rail 15c, and the fuel injection valve 15.

An intake pipe 16in and an exhaust pipe 16ex are respectively connected to an intake port 12in and an exhaust port 12ex formed in the cylinder head 12. An EGR pipe 17 is connected to each of the intake pipe 16in and the exhaust pipe 16ex, so that EGR gas that is part of exhaust gas flows (refluxes) into the intake pipe 16in through the EGR pipe 17. An EGR valve 17a is attached to the EGR pipe 17. The aperture of the EGR pipe 17 is controlled with the ECU 80 controlling the operation of the EGR valve 17a, whereby the flow rate of the EGR gas is controlled.

In addition, an EGR cooler 17b for cooling the EGR gas, a bypass pipe 17c, and a temperature control valve 17d are attached to the upstream portion of the EGR valve 17a among the EGR pipe 17. The bypass pipe 17c forms a bypass flow path through which the EGR gas bypasses the EGR cooler 17b. The temperature control valve 17d adjusts a ratio between the EGR gas flowing through the EGR cooler 17b and the EGR gas flowing through the bypass flow path and finally adjusts the temperature of the EGR gas flowing into the intake pipe 16in by adjusting the aperture of the bypass flow path. The intake air flowing into the intake port 12in contains external air (fresh air) flowing into from the intake pipe 16in and the EGR gas. Therefore, adjusting the temperature of the EGR gas by the temperature control valve 17d corresponds to adjusting an intake manifold temperature that is the temperature of the intake air flowing into the intake port 12in.

The combustion system includes an unshown supercharger. The supercharger has a turbine to be attached to the exhaust pipe 16ex and a compressor to be attached to the intake pipe 16in. When the turbine rotates by the flow velocity energy of the exhaust, the compressor rotates by the rotational force of the turbine, whereby the fresh air is compressed, i.e., supercharged by the compressor. The supercharging pressure regulator 26 is a device for changing the capacity of the turbine, and the turbine capacity is adjusted with the ECU 80 controlling the operation of the supercharging pressure regulator 26, whereby the supercharging pressure by the compressor is controlled.

Detection signals detected by various sensors, such as the in-cylinder pressure sensor 21, an oxygen concentration sensor 22, a rail pressure sensor 23, a crank angle sensor 24, and an accelerator pedal sensor 25, are inputted to the ECU 80.

The in-cylinder pressure sensor 21 outputs a detection signal corresponding to the pressure (in-cylinder pressure) of the combustion chamber 11a. The in-cylinder pressure sensor 21 has a temperature detection element 21a in addition to a pressure detection element, and also outputs a detection signal corresponding to the temperature (in-cylinder temperature) of the combustion chamber 11a. The oxygen concentration sensor 22 is attached to the intake pipe 16in, and outputs a detection signal corresponding to the oxygen concentration of the intake air. The intake air to be detected is a mixture of fresh air and the EGR gas. The rail pressure sensor 23 is attached to the common rail 15c, and outputs a detection signal corresponding to the pressure (rail pressure) of the accumulated fuel. The crank angle sensor 24 outputs a detection signal corresponding to the rotation speed of a crankshaft rotationally driven by the piston 13, that is, to the rotation number (engine rotation number) of the crankshaft per unit time. The accelerator pedal sensor 25 outputs a detection signal corresponding to the depression amount (engine load) of an accelerator pedal to be depressed by a vehicle driver.

Based on these detection signals, the ECU 80 controls the operations of the fuel injection valve 15, the fuel pump 15p, the EGR valve 17a, the temperature control valve 17d, and the supercharging pressure regulator 26. Thereby, a fuel injection start timing, an injection amount, an injection pressure, an EGR gas flow rate, an intake manifold temperature, and a supercharging pressure are controlled.

The microcomputer 80a, while controlling the operation of the fuel injection valve 15, functions as an injection control unit 83 that controls a fuel injection start timing, an injection amount, and the number of injection stages related to multi-stage injection. The microcomputer 80a, while controlling the operation of the fuel pump 15p, functions as a fuel pressure control unit 84 that controls an injection pressure. The microcomputer 80a, while controlling the operation of the EGR valve 17a, functions as an EGR control unit 85 that controls an EGR gas flow rate. The microcomputer 80a, while controlling the operation of the temperature control valve 17d, functions as an intake manifold temperature control unit 87 that controls an intake manifold temperature. The microcomputer 80a, while controlling the operation of the supercharging pressure regulator 26, functions as a supercharging pressure control unit 86 that controls a supercharging pressure.

Figures 2, 3:
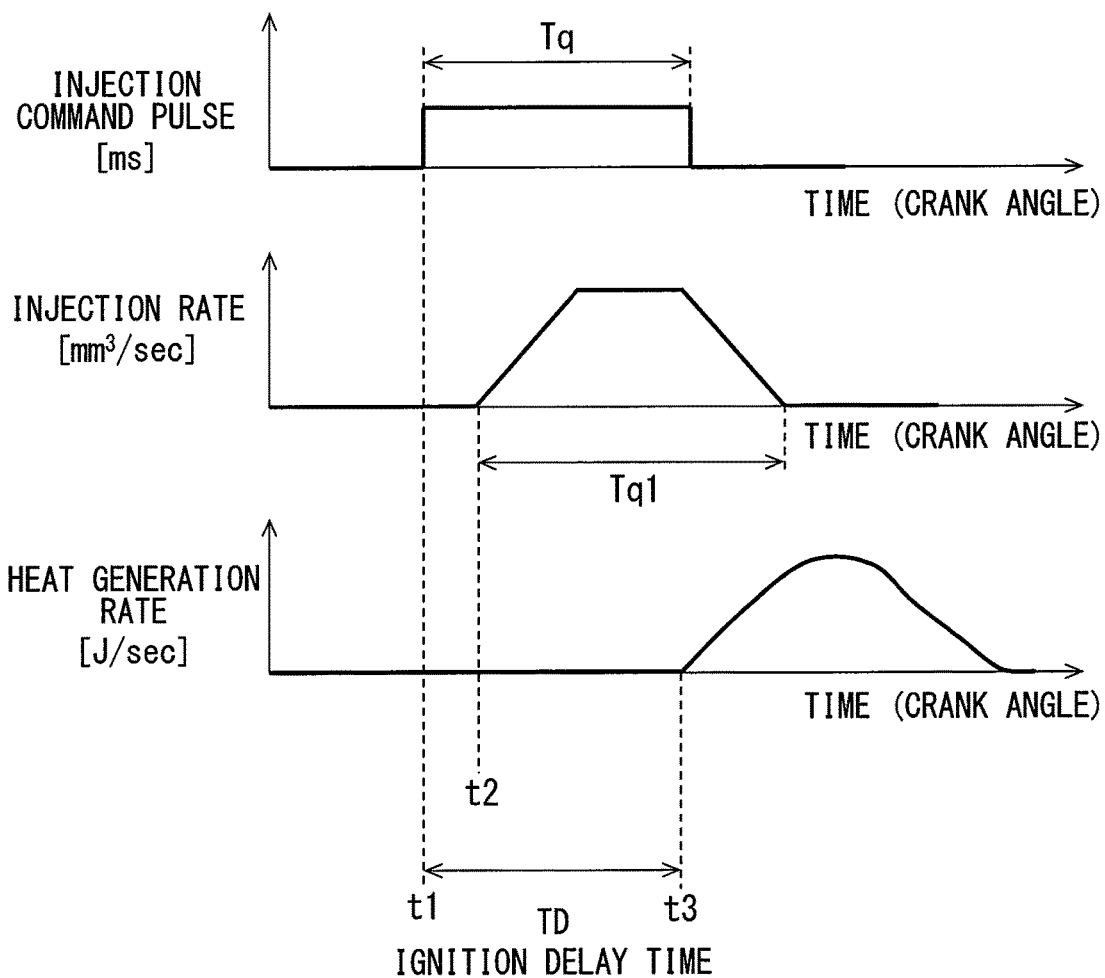
FIG. 2 is a view for explaining an ignition delay time.
FIG. 3 is a view for explaining a relationship among a plurality of ignition delay times, combustion conditions that are a combination of combustion environment values representing flammability, and mixing amounts of various components.

The microcomputer 80a also functions as a combustion property acquisition unit 81 that acquires a detected value (combustion property value) of a physical quantity related to combustion. The combustion property value according to the present embodiment is an ignition delay time TD shown in FIG. 2. The upper graph in FIG. 2 shows a pulse signal outputted from the microcomputer 80a. Powering the fuel injection valve 15 is controlled in accordance with the pulse signal. Specifically, the powering is started at a pulse-on timing t1, and is continued for a pulse-on period Tq. In short, an injection start timing is controlled by a pulse-on timing. In addition, an injection period is controlled by the pulse-on period Tq, which finally controls an injection amount.

The middle graph in FIG. 2 shows a change in the injection state of the fuel from the injection hole, the change being generated as a result of the fact that the valve body opens and closes in accordance with the pulse signal.

Specifically, a change in the injection amount (injection rate) of the fuel injected per unit time is shown. As shown in the graph, there is a time lag between the timing t1 at which the powering is started and a timing t2 at which injection is actually started. There is also a time lag between a timing at which the powering is ended and a timing at which the injection is actually stopped. A period Tq1 for which the injection is actually being performed is controlled by the pulse-on period Tq.

The lower graph in FIG. 2 shows a change in the combustion state of the injected fuel in the combustion chamber 11a. Specifically, a change in a heat amount (heat generation rate) per unit time is shown, the change being generated with a mixture of the injected fuel and the intake air self-igniting and burning. As shown in the graph, there is a time lag between the timing t2 at which the injection is started and a timing t3 at which combustion is actually started. In the present embodiment, the time between the timing t1 at which powering is started and the timing t3 at which combustion is started is defined as the ignition delay time TD.

The combustion property acquisition unit 81 estimates the timing t3 at which the combustion is started based on a change in the in-cylinder pressure detected by the in-cylinder pressure sensor 21. Specifically, a timing at which the in-cylinder pressure suddenly rises during a period for which a crank angle rotates by a predetermined amount after the piston 13 reaches a top dead center, is estimated as a combustion start timing (timing t3). The ignition delay time TD is calculated by the combustion property acquisition unit 81 based on this estimation result. The combustion property acquisition unit 81 further acquires various states (combustion conditions) during combustion for each combustion. Specifically, at least one of an in-cylinder pressure, an in-cylinder temperature, an intake oxygen concentration, an injection pressure, and air-fuel mixture flow velocity is acquired as a combustion environment value.

These combustion environment values are parameters representing the flammability of a fuel, and it can be said that each of the in-cylinder pressure just before combustion, the in-cylinder temperature just before combustion, the intake oxygen concentration, the injection pressure, and the air-fuel mixture flow velocity increases to a higher level, the air-fuel mixture is more likely to self-ignite and burn. As the in-cylinder pressure and in-cylinder temperature just before combustion, for example, the values, detected at the timing t1 at which powering the fuel injection valve 15 is started, may be used. The in-cylinder pressure is detected by the in-cylinder pressure sensor 21, the in-cylinder temperature by the temperature detection element 21a, the intake oxygen concentration by the oxygen concentration sensor 22, and the injection pressure by the rail pressure sensor 23. The air-fuel mixture flow velocity is the flow velocity of the air-fuel mixture in the combustion chamber 11a just before combustion. Since this flow velocity becomes higher as the engine rotation number becomes larger, it is calculated based on the engine rotation number. The combustion property acquisition unit 81 stores the acquired ignition delay time TD in the memory 80*b* in association with a combination of the combustion environment values (combustion conditions) related to the combustion.

The microcomputer 80*a* also functions as a mixing ratio estimation unit 82 that estimates mixing ratios of various components contained in a fuel based on a plurality of combustion property values detected under different combustion conditions. The mixing amounts of various components are calculated, for example, by substituting the ignition delay times TD for respective different combustion conditions into the determinant shown in FIG. 3. The mixing ratios of various components are calculated by dividing the respective calculated mixing amounts by the total amount.

The matrix on the left side of FIG. 3 is x rows and 1 column, and the numerical values of this matrix represent the mixing amounts of various components. The various components are ones classified according to the differences among the types of molecular structures. The types of the molecular structures include normal paraffins, isoparaffins, naphthenes, and aromas.

The matrix on the left side of the right side is x rows and y columns, and the numerical values of this matrix represent constants determined based on the tests conducted in advance. The matrix on the right side of the right side is y rows and 1 column, and the numerical values of this matrix represent the ignition delay times TD acquired by the combustion property acquisition unit 81. For example, the numerical value of the first row and first column is an ignition delay time TD (condition i) acquired under a combustion condition i including a predetermined combination of the combustion environment values, and the numerical value of the second row and first column is an ignition delay time TD (condition j) acquired under a combustion condition j. Between the combustion conditions i and j, all of the combustion environment values are set to be different from each other. In the following description, an in-cylinder pressure, an in-cylinder temperature, an intake oxygen concentration, and an injection pressure related to the combustion condition i are set to P (condition i), T (condition i), $O_2$ (condition i), and Pc (condition i), respectively. An in-cylinder pressure, an in-cylinder temperature, an intake oxygen concentration, and an injection pressure related to the combustion condition j are set to P (condition j), T (condition j), $O_2$ (condition j), and Pc (condition j), respectively.

Next, the theory that the mixing amount of each molecular structure species can be calculated by substituting the ignition delay times TD for the respective combustion conditions into the determinant of FIG. 3 will be described with reference to FIGS. 4, 5, and 6.

As the concentration of oxygen (in-cylinder oxygen concentration) contained in an air-fuel mixture related to combustion is higher, the mixture is more likely to self-ignite, and hence the ignition delay time TD becomes shorter, as shown in FIG. 4. Three solid lines (1), (2), and (3) in the view are property lines each showing the relationship between the in-cylinder oxygen concentration and the ignition delay time TD. However, this property line differs depending on a fuel. Strictly speaking, the property line differs depending on the mixing ratio of each molecular structure species contained in a fuel. Therefore, by detecting the ignition delay time TD occurring when the in-cylinder oxygen concentration is $O_2$ (condition i), which molecular structure species is contained can be estimated. In particular, by comparing the ignition delay time TD occurring when the in-cylinder oxygen concentration is $O_2$ (condition i) with the ignition delay time TD occurring when the in-cylinder oxygen concentration is $O_2$ (condition j), the mixing ratio can be estimated with higher accuracy.

Similarly, as the in-cylinder temperature is higher, the air-fuel mixture is more likely to self-ignite, and hence the ignition delay time TD becomes shorter, as shown in FIG. 5. Three solid lines (1), (2), and (3) in the view are property lines each showing the relationship between the in-cylinder temperature and the ignition delay time TD. However, this property line differs depending on a fuel. Strictly speaking, it differs depending on the mixing ratio of each molecular structure species contained in a fuel. Therefore, by detecting the ignition delay time TD occurring when the in-cylinder temperature is B1, which molecular structure species is contained can be estimated. In particular, by comparing the ignition delay time TD occurring when the in-cylinder temperature is T (condition i) with the ignition delay time TD occurring when the in-cylinder temperature is T (condition j), the mixing ratio can be estimated with higher accuracy.

Similarly, as the injection pressure is higher, oxygen is more likely to be taken in and the air-fuel mixture is more likely to self-ignite, and hence the ignition delay time TD becomes shorter. Strictly speaking, a sensitivity differs depending on the mixing ratio of each molecular structure species contained in a fuel. Therefore, by detecting the ignition delay time TD occurring when the injection pressure is different, the mixing ratio can be estimated with higher accuracy.

In addition, a molecular structure species having a high influence on the property line related to the in-cylinder oxygen concentration (see FIG. 4) is different from a molecular structure species having a high influence on the property line related to the in-cylinder temperature (see FIG. 5). Thus, molecular structure species having high influences on the property lines each related to each of a plurality of combustion conditions are different from each other. Therefore, based on a combination of the ignition delay times TD acquired by setting a combination of a plurality of the combustion environment values (combustion conditions) to different values, it can be estimated with high accuracy which molecular structure species is mixed in a large amount, as shown in, for example, FIG. 6. In the following description, the in-cylinder oxygen concentration is referred to as a first combustion environment value, the in-cylinder temperature as a second combustion environment value, and a property line related to the first combustion environment value as a first property line, and a property line related to the second combustion environment value as a second property line.

A molecular structure species A shown in FIG. 6 is one having a high influence on a property line (hereinafter referred to as the first property line) related to the in-cylinder oxygen concentration as the first combustion environment value. A molecular structure species B is one having a high influence on a property line (hereinafter referred to as the second property line) related to the in-cylinder temperature as the second combustion environment value, and a molecular structure species C is one having a high influence on a third property line related to a third combustion environment value. It can be said that as a change in the ignition delay time TD is larger with respect to a change in the first combustion environment value, a larger amount of the molecular structure species A is mixed. Similarly, it can be said that as a change in the ignition delay time TD is larger with respect to a change in the second combustion environment value, a larger amount of the molecular structure species B is mixed, and it can be said that as a change in the ignition delay time TD is larger with respect to a change in the third combustion environment value, a larger amount of the molecular structure species C is mixed. Therefore, the mixing ratios of the molecular structure species A, B, and C can be estimated for each of the different fuels (1), (2), and (3).

Next, the processing of a program executed by the combustion property acquisition unit 81 will be described. This processing is executed each time when the below-described pilot injection is commanded. Injection may be controlled such that a fuel is injected from the same fuel injection valve 15 more than once (multi-stage injection) during one combustion cycle. Of these multiple times of injection, the injection in which the largest injection amount is set is referred to as main injection, and the injection just before that as pilot injection.

First, the combustion property acquisition unit 81 calculates the ignition delay time TD related to the pilot injection by estimating the combustion start timing t3 based on the value detected by the in-cylinder pressure sensor 21, as described above. Next, the ignition delay time TD is stored in the memory 80b in association with a combination of a plurality of the combustion environment values (combustion conditions).

Specifically, a numerical range within which each combustion environment value can fall is divided into a plurality of regions, so that a combination of the regions of a plurality of the combustion environment values is preset. For example, the ignition delay time TD (condition i) shown in FIG. 3 represents an ignition delay time TD acquired when the regions of P (condition i), T (condition i), $O_2$ (condition i), and Pc (condition i) are combined. Similarly, the ignition delay time TD (condition j) represents an ignition delay time TD acquired when the regions of P (condition j), T (condition j), $O_2$ (condition j), and Pc (condition j) are combined.

When there is a high possibility that another fuel may have mixed with the fuel stored in the fuel tank when a user has supplied the other fuel, it is assumed that the mixing ratios of molecular structure species have been changed, and the values of the estimated mixing amounts are reset. For example, when an increase in the remaining fuel amount is detected, during the stop of the operation of the internal combustion engine 10, by a sensor that detects the amount of the fuel remaining in the fuel tank, the above values are reset.

The combustion property acquisition unit 81 calculates the mixing amount of each molecular structure species by substituting the ignition delay times TD into the determinant of FIG. 3. The number of columns of the matrix representing constants is changed in accordance with the number of samples, that is, with the number of the rows of the matrix on the right side of the right side of the determinant. Alternatively, regarding the ignition delay times TD that have not been acquired, preset nominal values are substituted into the matrix of the ignition delay times TD. The mixing ratio of each molecular structure species is calculated based on the mixing amount of each molecular structure species thus calculated.

The fuel supply system has a sliding portion that slides while being exposed to a fuel. For example, when the fuel pump 15p has a structure including a piston 15p1 and a cylinder 15p2 and the piston 15p1 pumps a fuel, an outer peripheral portion S1 of the piston 15p1 corresponds to a sliding portion that slides on the inner peripheral surface of the cylinder 15p2. For example, when the fuel injection valve 15 has a structure in which a valve body that opens and closes the injection hole is accommodated in the body, an outer peripheral portion S2 of the valve body corresponds to a sliding portion that slides on the inner peripheral surface of the body. In such sliding portions, a fuel functions as a lubricant. Therefore, if a fuel having low lubricity is used, there is a high risk that either or both of the sliding portions may be damaged, which may result in a sliding failure.

Therefore, the ECU 80 estimates the lubricity of a fuel based on the mixing ratio of each molecular structure species, and controls the operation of the fuel supply system in accordance with the estimation result. The ECU 80, while estimating the lubricity, provides the lubricity estimation device. The ECU 80, while controlling the operation of the fuel supply system in accordance with the estimation result, provides the fuel supply control device.

As described above, the microcomputer 80a also functions as the injection control unit 83, the fuel pressure control unit 84, the EGR control unit 85, the supercharging pressure control unit 86, and the intake manifold temperature control unit 87. These control units set target values based on an engine rotation number, an engine load, an engine cooling water temperature, and the like, and perform feedback control such that control objects become the target values. Alternatively, these control units perform open control with contents corresponding to the target values.

The injection control unit 83 controls the injection start timing, the injection amount, and the number of injection stages by setting the pulse signal in FIG. 2 such that the injection start timing, the injection amount, and the number of injection stages become the target values (injection control). The number of injection stages means the number of injection related to the above-described multi-stage injection. Specifically, the on-time (powering time) and the pulse on rising timing (powering start timing) of a pulse signal corresponding to the target values are stored in advance on a map. Then, a powering time and a powering start timing, corresponding to the target values, are acquired from the map so that the pulse signal is set.

In addition, an output torque obtained by injection, and emission state values such as a NOx amount and a smoke amount are stored. Then, in setting the target values based on an engine rotation number, an engine load, and the like in the next and subsequent injection, the target values are corrected based on the values stored as described above. In short, feedback control is performed by correcting the target values such that the deviations between the actual output torque and emission state values and the desired output torque and emission state values are made zero.

The fuel pressure control unit 84 controls the operation of a metering valve 15p3 that controls the flow rate of the fuel to be sucked into the fuel pump 15p. Specifically, the operation of the metering valve 15p3 is feedback-controlled based on the deviation between the actual rail pressure detected by the rail pressure sensor 23 and a target pressure Ptrg (target value). As a result, a discharge amount per unit time, the discharge being performed by the fuel pump 15p, is controlled, and the operation of the metering valve 15p3 is controlled such that the actual rail pressure becomes the target value (fuel pressure control). Since the fuel pump 15p is driven by the rotational force of the crankshaft of the internal combustion engine 10, the fuel pump 15p operates at high speed when the engine rotation number is high. The operation of the fuel pump 15p varies in accordance with an engine rotation number, as described above, but the discharge pressure of the fuel pump 15p can be adjusted to the target pressure Ptrg by controlling the operation of the metering valve 15p3.

The EGR control unit 85 sets the target value of an EGR amount based on an engine rotation number, an engine load, and the like. Then, the EGR amount is controlled by controlling the aperture of the EGR valve 17a (EGR control) based on this target value. The supercharging pressure control unit 86 sets the target value of a supercharging pressure based on an engine rotation number, an engine load, and the like. The supercharging pressure is controlled by controlling the operation of the supercharging pressure regulator 26 (supercharging pressure control) based on this target value. The intake manifold temperature control unit 87 sets the target value of an intake manifold temperature based on an outside air temperature, an engine rotation number, an engine load, and the like. The intake manifold temperature is controlled by controlling the aperture of the temperature control valve 17d (intake manifold temperature control) based on this target value.

Further, the microcomputer 80a calculates a lubrication index Z, an index representing the above-described lubricity, so that the target values of the above various controls are changed in accordance with the lubrication index Z. It is represented in the present embodiment that as the lubrication index Z is higher, the lubricity is better. The microcomputer 80a, while calculating the lubrication index Z, corresponds to a lubrication index calculation unit 88, and the microcomputer 80a, while changing the target values in accordance with the lubrication index Z, corresponds to a protection control unit 89. The protection control unit 89 executes protection control in which the target values are changed to reduce the workload of the fuel pump 15p.

For example, as the lubrication index Z is lower, the upper limit value of the target pressure Ptrg, set by the fuel pressure control unit 84, is set to be smaller. According to this, the temperature of a fuel lowers with a reduction in the pressure of the fuel, and hence the dynamic viscosity of the fuel increases, whereby deterioration of the lubricity can be suppressed. Therefore, the risk that various sliding portions may be damaged can be reduced.

In addition, for example, as the lubrication index Z is lower, the upper limit value of the target value of the injection amount, set by the injection control unit 83, is set to be smaller; the upper limit value of an engine rotation number is set to be smaller; or the upper limit value of the running speed of a vehicle is set to be smaller. According to this, the output of the internal combustion engine 10 is limited, and hence the operation speed of the fuel pump 15p is also limited. Therefore, the sliding speed of the sliding portion of the fuel pump 15p, that is, the sliding speed of the outer peripheral portion S1 of the piston 15p1 with respect to the cylinder 15p2 becomes low, whereby the risk that the piston 15p1 or the cylinder 15p2 may be damaged can be reduced.

Next, the procedures for calculating the lubrication index Z by the lubrication index calculation unit 88 and the procedures for the control by the protection control unit 89 will be described with reference to FIG. 7. This processing is repeatedly executed, during the operation period of the internal combustion engine 10, at predetermined intervals by the microcomputer 80a.

Figure 7:
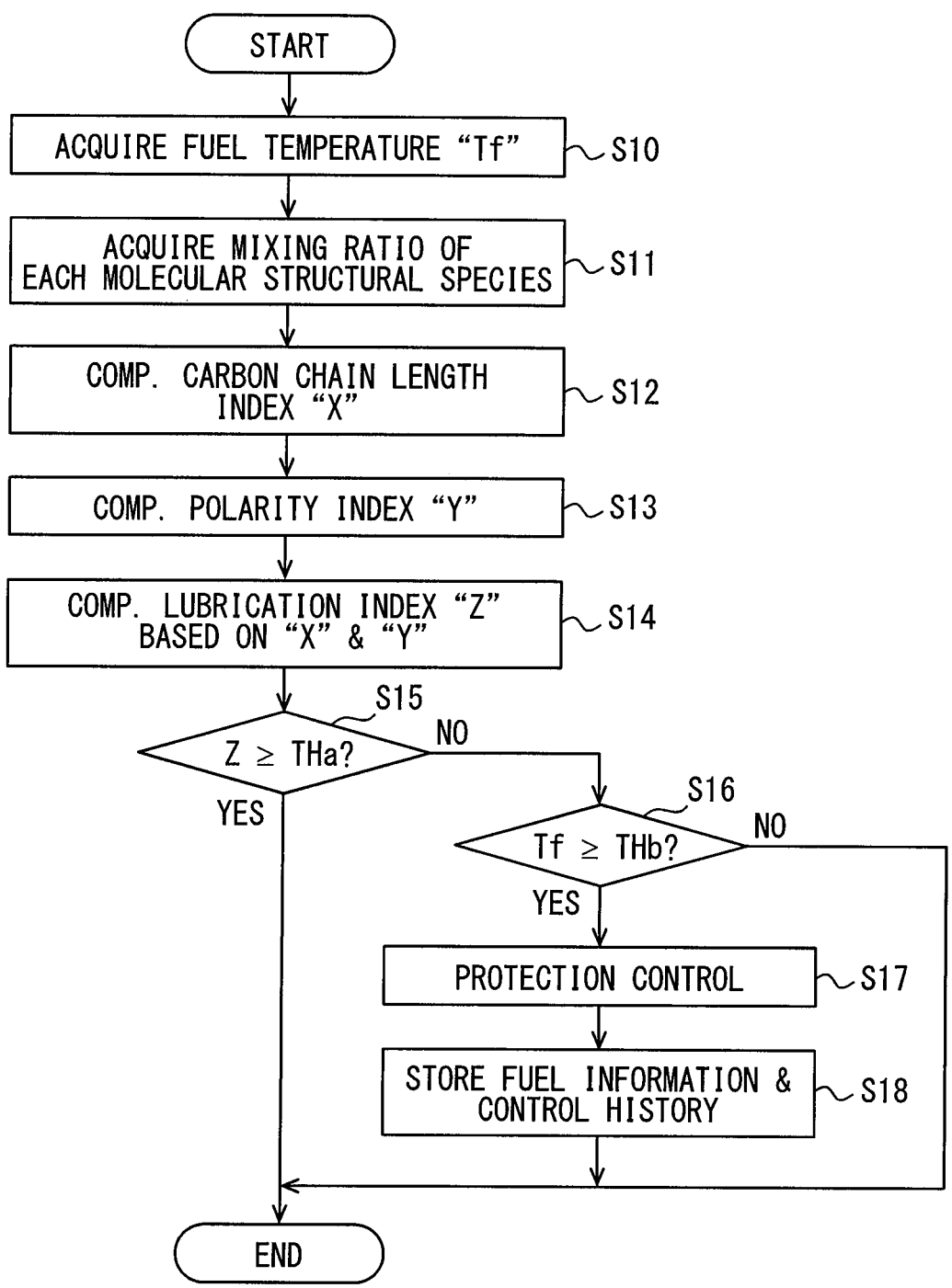
FIG. 7 is a flowchart that shows a process flow of the microcomputer shown in FIG. 1 and that shows procedures for estimating a lubrication index and controlling the operation of the fuel supply system based on the estimation result.

First, a fuel temperature Tf, a result detected by the fuel temperature sensor 29, is acquired in Step S10 in FIG. 7. The fuel temperature Tf varies in accordance with pressure, but herein the temperature of a fuel in a low-pressure state occurring before the pressure of the fuel is increased by the fuel pump 15p, that is, the temperature of a fuel to be sucked into the fuel pump 15p is acquired as the fuel temperature Tf.

In the following Step S11, the mixing ratio estimated by the mixing ratio estimation unit 82 is acquired. That is, the mixing ratio of each molecular structural species shown on the left side of FIG. 3 is acquired. In the following Steps S12 and S13, the later-described carbon chain length index X and polarity index Y are calculated based on the mixing ratio acquired in Step S11, and in the following Step S14, the lubrication index Z is calculated based on the calculated carbon chain length index X and polarity index Y. The lubrication index Z is calculated by the equation of $Z=a\cdot X+b\cdot Y$, in which "a" and "b" are coefficients set to positive values. Therefore, as the value of the carbon chain length index X is larger or as the value of the polarity index Y is larger, the value of the lubrication index Z becomes larger, which indicates that the lubricity is good and finally seizure hardly occurs.

First, the technical significance of the carbon chain length index X will be described.

The present inventors have obtained the knowledge that as the mixing ratio of molecular structures each having a large number of carbon atoms, among plural types of molecular structures contained in a fuel, is larger, the dynamic viscosity of the fuel becomes higher and the lubricity becomes better. In the present embodiment, as the mixing ratio of molecular structures each having a large number of carbon atoms is larger, the carbon chain length index X is calculated to be a larger value in view of this knowledge. For example, the average number of carbon atoms of plural types of molecular structures is calculated. Then, regarding four types of molecular structures including normal paraffins each having a larger number of carbon atoms than the average number of carbon atoms, isoparaffins each having a larger number of carbon atoms than the average number of carbon atoms, normal paraffins each having a smaller number of carbon atoms than the average number of carbon atoms, and isoparaffins each having a smaller number of carbon atoms than the average number of carbon atoms, the carbon chain length index X is calculated as follows. That is, when mixing ratios r1, r2, r3, and r4 of the above four types are respectively acquired, coefficients a1, a2, a3, and a4 are set in advance for the respective four types of molecular structures. Then, a value, obtained by multiplying each mixing ratio by each coefficient and by adding the multiplied values together, is set to be the carbon chain length index X. That is, $X=a1\cdot r1+a2\cdot r2+a3\cdot r3+a4\cdot r4$.

The coefficient a1 for normal paraffins each having a larger number of carbon atoms than the average number of carbon atoms (hereinafter referred to as many-carbon) and the coefficient a2 for the many-carbon isoparaffins are set to positive values. As the mixing ratios of the many-carbon normal paraffins and the many-carbon isoparaffins are larger, the carbon chain length index X is set to a larger value. In addition, the coefficient a1 for the many-carbon normal paraffins is set to a larger value than the coefficient a2 for the many-carbon isoparaffins. That is, the many-carbon normal paraffins are set to have a larger contribution to improve the lubricity than the many-carbon isoparaffins.

The coefficient a3 for normal paraffins each having a smaller number of carbon atoms than the average number of carbon atoms (hereinafter referred to as few-carbon) and the coefficient a4 for the few-carbon isoparaffins are set to negative values. That is, as the mixing ratios of the few-carbon normal paraffins and the few-carbon isoparaffins are larger, the carbon chain length index X is set to a smaller value. In addition, the coefficient a3 for the few-carbon normal paraffins is set to a smaller value than the coefficient a4 for the few-carbon isoparaffins. That is, the few-carbon isoparaffins are set to have a larger contribution to deteriorate the lubricity than the few-carbon normal paraffins.

In short, the many-carbon molecular structure species have a large contribution to increase a dynamic viscosity, and as the mixing ratios of the many-carbon molecular structure species are larger, the lubricity becomes better. Therefore, at least the mixing ratios of the many-carbon molecular structural species are used for the calculation of the carbon chain length index X. Of the many-carbon molecular structure species, normal paraffins particularly have a large contribution to increase a dynamic viscosity. For example, when normal paraffins and isoparaffins, both having the same carbon chain length, are compared with each other, the normal paraffins have a higher contribution to increase a dynamic viscosity than the isoparaffins. Therefore, at least the mixing ratio of the many-carbon normal paraffins is used for the calculation of the carbon chain length index X.

Next, the technical significance of the polarity index Y will be described.

Electronegativity, the strength to attract a shared electron pair between atoms, is different depending on the type of an element. When atoms having different electronegativities are bonded, a shared electron pair is attracted to one atom, whereby a charge bias occurs in a molecule. This is referred to as polarity of binding, and a molecule having a charge bias therethroughout is referred to as a polar molecule, and a molecule having no bias referred to as a non-polar molecule. As such a charge bias (polarity) is larger, the force, by which a molecule is adsorbed onto a metal surface, becomes larger. Therefore, as the mixing ratio of molecular structures each having a large polarity is larger, a fuel is more likely to be held in a sliding portion, whereby the lubricity becomes better. In particular, in the case of a molecular structure having a cyclic carbon chain, a $\pi$ bond occurs between a plurality of cyclic carbon chains, whereby polarity becomes extremely large due to this $\pi$ bond. That is, as the mixing ratio of the molecular structures each having a cyclic carbon chain is larger, a phenomenon, in which a fuel is more likely to be held in a sliding portion as an oil film, becomes conspicuous.

In the present embodiment, as the mixing ratio of the molecular structures each having a large polarity is larger, the polarity index Y is calculated to be a larger value in view of this knowledge. For example, regarding four types of molecular structures including aromas each having a structure having two or more of cyclic carbon chains (hereinafter referred to as polycyclic), aromas each having a structure having one or more of cyclic carbon chains (hereinafter referred to as monocyclic), polycyclic naphthenes, and monocyclic naphthenes, the polarity index Y is calculated as follows. That is, when mixing ratios r5, r6, r7, and r8 of the above four types are respectively acquired, coefficients a5, a6, a7, and a8 are set in advance for the respective four types of molecular structures. Then, a value, obtained by multiplying each mixing ratio by each coefficient and by adding the multiplied values together, is set to be the polarity index Y. That is, $Y = a5 \cdot r5 + a6 \cdot r6 + a7 \cdot r7 + a8 \cdot r8$.

All of these coefficients a5, a6, a7, and a8 are set to positive values. That is, as the mixing ratio of molecular structures each having a cyclic carbon chain is larger, the polarity index Y is set to a larger value. The coefficient a5 for the polycyclic aromas is set to a larger value than the coefficient a6 for the monocyclic aromas. That is, the polycyclic aromas are set to have a larger contribution to improve the lubricity than the monocyclic aromas. The coefficient a6 for the monocyclic aromas is set to a larger value than the coefficient a7 for the polycyclic naphthenes. That is, the monocyclic aromas are set to have a larger contribution to improve the lubricity than the polycyclic naphthenes. The coefficient a7 for the polycyclic naphthenes is set to a larger value than the coefficient a8 for the monocyclic naphthenes. That is, the polycyclic naphthenes are set to have a larger contribution to improve the lubricity than the monocyclic naphthenes.

In short, the polycyclic molecular structures have a larger contribution to improve the lubricity than the monocyclic molecular structures. Aromas have a larger contribution to improve the lubricity than naphthenes. Further, molecular structures each having a cyclic carbon chain, such as aromas and naphthenes, have a larger contribution to improve the lubricity than molecular structures each having a non-cyclic carbon chain, such as paraffins. Therefore, at least the mixing ratio of the molecular structures of aromas is used for the calculation of the polarity index Y. For both aromas and naphthenes, the polycyclic molecular structures have a larger contribution to improve the lubricity than the monocyclic molecular structures. Therefore, at least the mixing ratio of the polycyclic molecular structures is used for the calculation of the polarity index Y.

In short, the lubrication index Z is calculated in Step S14 based on the mixing ratio of each molecular structure. The molecular structure species to be used for the calculation include normal paraffins, isoparaffins, aromas and naphthenes. The normal paraffins are further classified into the many-carbon normal paraffins and the few-carbon normal paraffins, and at least the many-carbon normal paraffins are included. The isoparaffins are further classified into the many-carbon isoparaffins and the few-carbon isoparaffins, and at least the few-carbon isoparaffins are included. The aromas are further classified into the aromas having two or more of cyclic carbon chains and the aromas having one cyclic carbon chain, and at least the aromas having two or more of cyclic carbon chains are included. The naphthenes are further classified into the naphthenes having two or more of cyclic carbon chains and the naphthenes having one cyclic carbon chain, and at least the naphthenes having two or more of cyclic carbon chains are included.

The coefficient to be used for the calculation of the carbon chain length index X and to multiply the mixing ratio of the molecular structures each having a cyclic carbon chain, such as aromas and naphthenes, is set to a smaller value than the coefficient to multiply the mixing ratio of the molecular structures each having no cyclic carbon chain. The coefficient to be used for the calculation of the polarity index Y and to multiply the mixing ratio of the molecular structures each having no cyclic carbon chain is set to a smaller value than the coefficient to multiply the mixing ratio of the molecular structures each having a cyclic carbon chain.

Returning to the description of FIG. 7, it is determined in the following Step S15 whether the lubrication index Z calculated in Step S14 is equal to or larger than a predetermined threshold value THa. The threshold value THa is a value stored in the preset memory 80b. When it is determined that the lubrication index Z is smaller than the threshold value THa, it is determined in Step S16 whether the fuel temperature Tf acquired in Step S10 is equal to or higher than a predetermined threshold value THb. The threshold value THb is a value stored in the preset memory 80b. When it is determined that the fuel temperature Tf is equal to or higher than the predetermined threshold value THb, protection control for protecting a sliding portion is executed in the following Step S17, in which a damage in the sliding portion, which may occur due to low lubricity by a fuel, is suppressed.

In the protection control, the operation of the fuel supply system is controlled to reduce the workload of the fuel pump 15$p$. The upper limit of the pressure of a fuel is lowered, for example, by lowering the upper limit value of the target pressure Ptrg of the fuel pump 15$p$, as described above, whereby the upper limit of the fuel temperature is lowered. Thereby, deterioration of the lubricity, which may occur due to an excessive decrease in the dynamic viscosity of a fuel, can be suppressed, whereby the risk that a sliding portion may be damaged can be reduced. In addition, the output upper limit of the internal combustion engine 10 is lowered, for example, by lowering the upper limit value of the target value of the injection amount of the fuel injection valve 15, as described above, whereby the upper limit of the operation speed of the fuel pump 15$p$ is lowered. Thereby, the upper limit of the sliding speed of the piston 15$p$1 of the fuel pump 15$p$ is lowered, whereby the risk that the piston 15$p$1 or the cylinder 15$p$2 may be damaged can be reduced.

In short, when the lubrication index Z is smaller than the threshold value THa and the fuel temperature Tf is equal to or higher than the threshold value THb, the probability that the lubricity of a fuel may be extremely bad is high, and hence the protection control is executed in such a case, whereby a sliding portion is protected.

In the following Step S18, fuel information, information on the mixing ratio of a molecular structure species, and a control history, history of the protection control, are stored in the microcomputer 80$a$. For example, the mixing ratio of a molecular structural species, which changes every time when a fuel is supplied, is recorded and the control history is recorded in association with the recording.

When it is determined that the lubrication index Z is equal to or larger than the threshold value THa, it is assumed that the lubricity is sufficiently good and there is no need for the protection control, and the processing of FIG. 7 is ended without executing the processing of Steps S17 and S18. Even when it is determined that the lubrication index Z is smaller than the threshold value THa, it is assumed that the minimum lubricity is secured and there is no need for the protection control when it is determined that the fuel temperature Tf is lower than the threshold value THb, and the processing of FIG. 7 is ended without executing the processing of Steps S17 and S18.

The lubricity estimation device according to the present embodiment includes the mixing ratio estimation unit 82 and the lubrication index calculation unit 88, as described above. According to this, the lubrication index Z is calculated based on the mixing ratio of each of plural types of molecular structures contained in a fuel, and hence the lubrication index Z can be estimated with higher accuracy than in the case where the lubricity is estimated based on, for example, the dynamic viscosity detected by a dynamic viscosity sensor.

Further, in the present embodiment, the lubrication index calculation unit 88 calculates the lubrication index Z to be a value indicating that the lubricity is better, that is, to be a higher value, as the mixing ratio of molecular structures, each having a larger number of carbon atoms than the average number of carbon atoms of plural types of molecular structures contained in a fuel, is larger. According to the embodiment in which as the mixing ratio of molecular structures, each having a larger number of carbon atoms than the average number of carbon atoms, is larger, the lubrication index Z is made higher, the lubrication index Z can be estimated with high accuracy, because the molecular structures each having a large number of carbon atoms greatly contribute to increasing the dynamic viscosity of a fuel.

The present inventors have obtained the knowledge that among the molecular structures each having a large number of carbon atoms, normal paraffins particularly have a greater influence on raising the dynamic viscosity of a fuel and improving the lubricity than isoparaffins. Specifically, normal paraffins each having a large number of carbon atoms have a greater influence on increasing the carbon chain length index X than isoparaffins. In the present embodiment, the lubrication index calculation unit 88 calculates, in view of this point, the lubrication index Z by using at least the mixing ratio of the molecular structures of normal paraffins, among the molecular structures each having a larger number of carbon atoms than the average number of carbon atoms. Therefore, the lubrication index Z can be estimated with high accuracy.

In addition, the present inventors have obtained the knowledge that among the molecular structures each having a small number of carbon atoms, isoparaffins particularly have a great influence on lowering the dynamic viscosity of a fuel and deteriorating the lubricity. Specifically, isoparaffins each having a small number of carbon atoms have a great influence on lowering the carbon chain length index X. In the present embodiment, the lubrication index calculation unit 88 calculates, in view of this point, the lubrication index Z by using at least the mixing ratio of the molecular structures of isoparaffins, among the molecular structures each having a smaller number of carbon atoms than the average number of carbon atoms. Therefore, the lubrication index Z can be estimated with high accuracy.

The present inventors have obtained the knowledge that molecular structures each having a cyclic carbon chain have a large polarity, as described above, and hence they have a great influence on improving the adsorption force of a fuel to a sliding portion. Specifically, molecular structures each having a cyclic carbon chain have a great influence on increasing the polarity index Y. In other words, molecular structures each having a cyclic carbon chains, even if each of them has, for example, a smaller number of carbon atoms than the average number of carbon atoms, greatly contribute to improving the lubricity. In the present embodiment, the lubrication index calculation unit 88 calculates, in view of this point, the lubrication index Z to be a value indicating that the lubricity is better, that is, to be a higher value, as the mixing ratio of molecular structures each having a cyclic carbon chain is larger. Therefore, the lubrication index Z can be estimated with high accuracy.

In addition, the present inventors have obtained the knowledge that among the molecular structures each having a cyclic carbon chain, aromas particularly have a greater influence on improving the lubricity than, for example, naphthenes. Specifically, aromas have a great influence on increasing the polarity index Y. In the present embodiment, the lubrication index calculation unit 88 calculates, in view of this point, the lubrication index Z by using at least the mixing ratio of the molecular structures of aromas, among the molecular structures each having a cyclic carbon chain. Therefore, the lubrication index Z can be estimated with high accuracy.

In addition, the present inventors have obtained the knowledge that molecular structures each having two or more of cyclic carbon chains have a larger polarity than molecular structures each having one cyclic carbon chain, and hence the former molecular structures particularly improve the adsorption force of a fuel to a sliding portion.

In the present embodiment, the lubrication index calculation unit 88 calculates, in view of this point, the lubrication index Z by using at least the mixing ratio of molecular structures each having two or more of cyclic carbon chains, among the molecular structures each having a cyclic carbon chain. Therefore, the lubrication index Z can be estimated with high accuracy.

Herein, even if exactly the same fuel is burned, combustion property values, such as an ignition delay time and the amount of heat generated, differ when the combustion conditions at the time, such as an in-cylinder pressure and an in-cylinder temperature, differ. For example, in the case of the fuel (1) in FIG. 4, the ignition delay time TD (combustion property value) becomes shorter as the combustion is performed under a condition in which the in-cylinder oxygen concentration is higher. A degree of change in the combustion property value with respect to a change in the combustion condition, that is, the property lines shown by the solid lines in FIG. 4 differ for each of the fuels (1), (2), and (3) in each of which the mixing ratio of a molecular structure species is different from the other two. In the present embodiment in which this point is taken into consideration, the mixing ratio of a molecular structure species contained in a fuel is estimated based on a plurality of the ignition delay times TD (combustion property values) detected under different combustion conditions, whereby the properties of the fuel can be grasped more accurately.

Further, in the present embodiment, the combustion condition is one specified by a combination of plural types of combustion environment values. That is, for each of the plural types of combustion environment values, a combustion property value, occurring when combustion is performed under a condition in which a combustion environment value is different, is acquired. According to this, a mixing ratio can be estimated with higher accuracy than in the case where for the same type of combustion environment values, a combustion property value, occurring when combustion is performed under a condition in which the combustion environment values are different, is acquired such that a mixing ratio is estimated based on the combustion condition and the combustion property values.

Furthermore, in the present embodiment, at least one of the in-cylinder pressure, the in-cylinder temperature, the intake oxygen concentration, and the fuel injection pressure is included in the plural types of combustion environment values related to the combustion conditions. According to the embodiment in which a mixing ratio is estimated by using combustion property values occurring when combustion is performed under a condition in which these combustion environment values are different, the mixing ratio can be estimated with high accuracy because these combustion environment values have a great influence on a combustion state.

Still furthermore, in the present embodiment, the combustion property value is the ignition delay time TD between when fuel injection is commanded and when the fuel self-ignites. According to the embodiment in which a mixing ratio is estimated based on the ignition delay time TD, the mixing ratio can be estimated with high accuracy because the ignition delay time TD is greatly influenced by the mixing ratios of various components.

Still furthermore, in the present embodiment, the combustion property acquisition unit 81 acquires a combustion property value related to the combustion of the fuel injected before the main injection (pilot injection). When the fuel of the main injection is burned, the in-cylinder temperature becomes high, and hence the fuel after the main injection is more likely to be burned. Therefore, a change in the combustion property value, occurring due to a difference between the mixing ratios in fuels, is less likely to appear. On the other hand, the fuel injected before the main injection (pilot injection) is not influenced by the main combustion, and hence a change in the combustion property value, occurring due to a difference between the mixing ratios in fuels, is more likely to appear. Therefore, in estimating a mixing ratio based on the combustion property values, the estimation accuracy can be improved.

Still furthermore, in the present embodiment, even when it is determined in Step S15 in FIG. 7 that the lubrication index Z is smaller than the threshold value THa, the protection control in Step S17 is not executed when it is determined in Step S16 that the fuel temperature Tf is equal to or higher than the threshold value THb. In other words, the protection control is executed on condition that the lubrication index Z is low and the fuel temperature Tf is high. On the other hand, even if the lubrication index Z is low, it is assumed that a dynamic viscosity is sufficiently high when the fuel temperature Tf is low, and hence the protection control is not executed. As described above, the fuel temperature Tf having a great influence on a dynamic viscosity is acquired, and it is determined in accordance with the acquired fuel temperature Tf whether the protection control should be executed, and hence the execution of the protection control in accordance with the actual lubricity can be achieved with high accuracy.

Second Embodiment

In the first embodiment, in calculating the lubrication index Z in Step S14, the lubrication index Z is calculated based on the carbon chain length index X and the polarity index Y without using the fuel temperature Tf. Other than the determination of the magnitude of the lubrication index Z in Step S15, the fuel temperature Tf is used in determining in Step S16 whether the protection control should be executed. In the present embodiment, however, the processing of Step S14 is changed to the processing of Step S14a, and the processing of Step S16 is omitted, as shown in FIG. 8.

Figure 8:
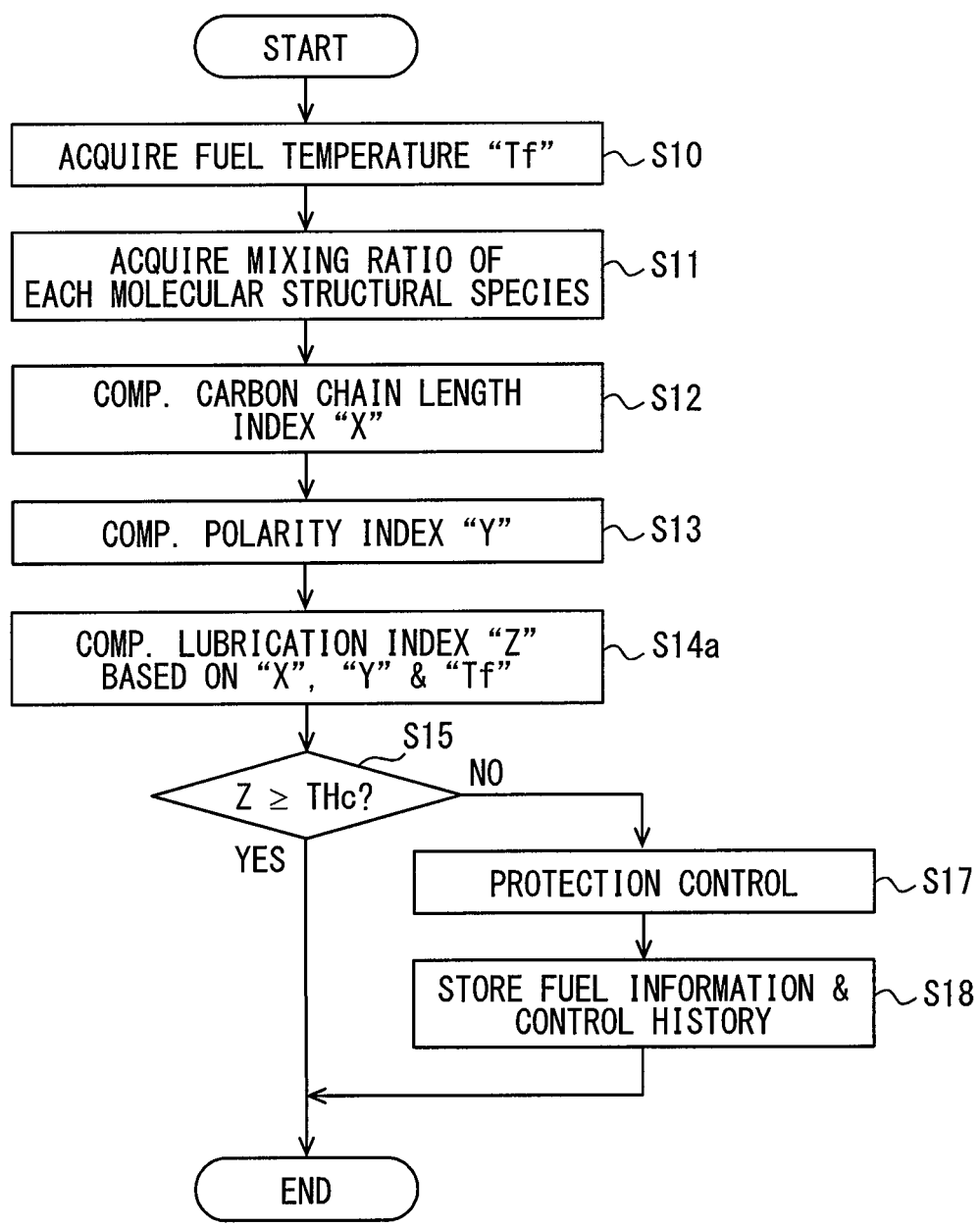
FIG. 8 is a flowchart showing, in a second embodiment of the present disclosure, procedures for estimating a lubrication index and controlling the operation of a fuel supply system based on the estimation result.

In Steps S10, S11, S12, and S13 in FIG. 8, the same processing as in FIG. 7 are executed. In the following Step S14a, in calculating the lubrication index Z based on the carbon chain length index X and the polarity index Y, the lubrication index Z is calculated also based on the fuel temperature Tf. Specifically, a lubrication index calculation unit 88 according to the present embodiment calculates the lubrication index Z to be a value indicating that the lubricity is better as the fuel temperature Tf is lower.

For example, a first function F1 (Tf), for calculating the lubrication index Z by using the fuel temperature Tf as a variable, is set based on the carbon chain length index X and the polarity index Y. Then, the lubrication index Z is calculated by substituting the fuel temperature Tf acquired in Step S10 into the first function F1 (Tf) that has been set. In short, a temperature lubrication property line, representing the relationship between the fuel temperature Tf and the lubrication index Z, is specified based on the carbon chain length index X and the polarity index Y. That is, the temperature lubrication property line is specified based on the mixing ratio of each molecular structure species. Then, the lubrication index Z is specified based on the detected fuel temperature Tf and with reference to the specified temperature lubrication property line.

Alternatively, a second function F2(X, Y, Tf), for calculating the lubrication index Z by using the carbon chain length index X, the polarity index Y, and the fuel temperature Tf as variables, is set based on the tests conducted in advance, the second function F2(X, Y, Tf) being stored in the memory 80b. Then, the lubrication index Z is calculated by substituting the calculated carbon chain length index X and polarity index Y and the detected fuel temperature Tf into the second function F2(X, Y, Tf).

In the following Step S15, it is determined whether the lubrication index Z calculated in Step S14a is equal to or larger than a predetermined threshold value THc. The threshold value THc is a value stored in the preset memory 80b. When it is determined that the lubrication index Z is smaller than the threshold value THc, the protection control and recording similar to those in FIG. 7 are executed in the following Steps S17 and S18. When it is determined in Step S15 that the lubrication index Z is equal to or larger than the threshold value THc, it is assumed that the minimum lubricity is secured and there is no need for the protection control, and the processing of FIG. 8 is ended without executing the processing of Steps S17 and S18.

Also, according to the present embodiment, the lubrication index Z is calculated based on the mixing ratio of each molecular structure species, as described above, and hence the lubrication index Z can be estimated with high accuracy, similarly to the first embodiment. Further, the lubrication index calculation unit 88 calculates the lubrication index Z to be a value indicating that the lubricity is better as the fuel temperature Tf is lower, and hence the lubrication index Z can be set to a value on which an influence of the fuel temperature Tf is reflected.

Third Embodiment

In the first embodiment, the mixing ratio estimation unit 82 estimates the mixing ratios of various components based on a plurality of the combustion property values. In the present embodiment, however, the general properties of a fuel are detected by sensors (property sensors), so that the mixing ratios are estimated based on the detection results.

Specific examples of the property sensors include a density sensor 27, a dynamic viscosity sensor 28, and the like. The density sensor 27 detects the density of a fuel based on, for example, a natural vibration period measuring method. The dynamic viscosity sensor 28 is, for example, a thin tube viscometer or a dynamic viscometer based on a thin wire heating method, and it detects the dynamic viscosity of the fuel in the fuel tank. The density sensor 27 and the dynamic viscosity sensor 28 include a heater, and detect the density and the dynamic viscosity of the fuel, respectively, in a state in which the fuel is heated to a predetermined temperature by the heater.

Herein, the present inventors have paid attention to the fact that: a specific property parameter of a fuel, that is, the above-described intermediate parameter correlates with the physical quantity of each molecular structure contained in a fuel composition; and a sensitivity to the molecular structure differs for each property parameter type. That is, when a molecular structure differs in a fuel, bonding force between molecules, steric hindrance due to structure, interaction, and the like differ. In addition, a fuel contains plural types of molecular structures, and the mixing ratios thereof differ from fuel to fuel. In this case, it is considered that a sensitivity contributing to a property parameter differs for each molecular structure, and hence the value of a property parameter changes depending on the amount of a molecular structure.

Therefore, the present inventors have established a correlation equation for the property parameters and the molecular structures. This correlation equation is an arithmetic expression of a property calculation model by which a plurality of property parameters are derived by using sensitivity coefficients indicating degrees of dependence of the amounts of a plurality of molecular structures on a plurality of the property parameters and by reflecting the sensitivity coefficients on the amounts of the molecular structures. The amount of a molecular structure contained in the fuel composition can be calculated by inputting, as the values of the property parameters, the values detected by the property sensors to the correlation equation.

In addition, a lower calorific value correlates with the dynamic viscosity and density of a fuel, and hence it can be calculated based on the dynamic viscosity and the density by using a map or an arithmetic expression representing the correlation. The lower calorific value thus calculated may be used as a property parameter to be inputted to the correlation equation.

In addition, an HC ratio, a ratio of the amount of hydrogen to the amount of carbon in a fuel, correlates with a lower calorific value, and hence the HC ratio can be calculated based on the lower calorific value by using a map or an arithmetic expression representing the correlation. The HC ratio thus calculated may be used as a property parameter to be inputted to the correlation equation. Other than these, a parameter related to cetane number or distillation property can also be used as the property parameter.

According to the present embodiment, a plurality of property parameters indicating the properties of a fuel are acquired as described above. Then, the amounts of a plurality of molecular structures, that is, the mixing ratio of each molecular structure species is estimated by using correlation data defining correlations between a plurality of property parameters and the amounts of a plurality of molecular structures in the fuel and based on the acquired values of the plurality of property parameters that have been acquired. Therefore, the mixing ratio of a molecular structure species, which is used for the estimation of the lubrication index Z, can be acquired by using the values detected by the property sensors, without using the values detected by the in-cylinder pressure sensor 21.

Other Embodiments

Although the preferred embodiments of the invention have been described above, the invention is not limited to the above-described embodiments at all, and various modifications can be made as exemplified below. Not only combinations of parts that clearly indicate that combinations are specifically possible in each embodiment, but also partial combinations of the embodiments are possible when there is no particular obstruction to the combinations, even if not explicitly stated.

In each of the above embodiments, the fuel temperature Tf to be used for calculating the lubrication index Z or for determining whether the protection control should be executed is set to the temperature of a fuel in a low pressure state occurring before the pressure of the fuel is increased by the fuel pump 15p, that is, set to the temperature of a fuel to be sucked into the fuel pump 15p. On the other hand, the temperature of a fuel after being pumped from the fuel pump 15, the pressure of the fuel being increased, may be used for calculating the lubrication index Z or for determining whether the protection control should be executed. The fuel temperature sensor 29 may be arranged, for example, in the pipe on the discharge side of the fuel pump 15*p* or in the common rail 15*c*. Alternatively, the temperature detected by the temperature detection element 21*a* may be used.

In each of the above embodiments, the carbon chain length index X and the polarity index Y are calculated based on the mixing ratio of each molecular structure species, and the lubrication index Z is estimated based on these indices. On the other hand, the lubrication index Z may be directly estimated based on the mixing ratio of each molecular structure species by omitting the calculation of the carbon chain length index X and the polarity index Y. For example, a coefficient, in which the carbon chain length index X and the polarity index Y are taken into consideration, is preset for each molecular structure species. The coefficient may be set such that a value, obtained by multiplying the mixing ratio of each molecular structure by the coefficient and by adding the multiplied values together, becomes the lubrication index Z.

In each of the above embodiments, the protection control is executed and the fuel information and the control history are recorded, when it is determined that lubricity by a fuel is low. On the other hand, a user may be warned with display or sound of the fact the lubricity by a fuel is deteriorated, by omitting the protection control and recording. Alternatively, at least one of these protection control, recording, and warning may be executed.

In the embodiment shown in FIG. 2, the time between the timing t1 at which powering is started and the timing t3 at which combustion is started is defined as the ignition delay time TD. On the other hand, the time between the timing t2 at which injection is started and the timing t3 at which combustion is started may be defined as the ignition delay time TD. The timing t2 at which injection is started may be estimated by detecting a timing at which a change in the fuel pressure such as the rail pressure occurs with the start of injection and based on the detected timing.

The combustion property acquisition unit 81 shown in FIG. 1 acquires the ignition delay time TD as a detected value (combustion property value) of a physical quantity related to combustion. On the other hand, the combustion property acquisition unit 81 may acquire, as the combustion property values, a waveform representing a change in the heat generation rate, a heat amount (heat generation amount) generated by the combustion of the corresponding fuel, and the like. In addition, the mixing ratios of various components may be estimated based on plural types of combustion property values such as the ignition delay time TD, the waveform of heat generation rate, and the heat generation amount. For example, the matrix (constants) on the left side of the right side of FIG. 3 are set to values corresponding to the plural types of combustion property values, and the mixing ratios are estimated by substituting the plural types of combustion property values into the matrix on the right side of the right side of FIG. 3.

In the example of FIG. 3, the combustion conditions are set such that all of the combustion environment values are different for each of the plurality of the ignition delay times TD. That is, for the respective combustion conditions i, j, k, and l (see FIG. 3) each formed of a predetermined combination of the combustion environment values, all of the in-cylinder pressures are set to different values P (condition i), P (condition j), P (condition k), and P (condition l). Similarly, all of the in-cylinder temperatures T, all of the intake oxygen concentrations $O_2$, and all of the injection pressures Pc are set to different values. On the other hand, for the respective different combustion conditions, at least one of the combustion environment values may be different. For example, for the respective combustion conditions i and j, all of the in-cylinder temperatures T, all of the intake oxygen concentrations $O_2$, and all of the injection pressures Pc are set to the same value, and only the in-cylinder pressures may be set to different values P (condition i) and P (condition j).

In the above embodiments, combustion property values related to the combustion of the fuel injected just before the main injection (pilot injection) are acquired. On the other hand, combustion property values related to the combustion of the fuel injected after the main injection may be acquired. Specific examples of the injection after the main injection include after-injection and post-injection. When multi-stage injection, in which injection is performed more than once before the main injection, is performed, it is preferable to acquire combustion property values related to the combustion of the fuel injected for the first time, because the combustion is not greatly influenced by the main combustion.

In the above embodiments, combustion property values are acquired based on the values detected by the in-cylinder pressure sensor 21. On the other hand, in a configuration not including the in-cylinder pressure sensor 21, combustion property values may be estimated based on the rotational fluctuation (differential value) of a rotation angle sensor. For example, the timing, at which the differential value exceeds a predetermined threshold value due to the pilot combustion, can be estimated as a pilot ignition timing. In addition, a pilot combustion amount can be estimated from the magnitude of the differential value.

In the embodiment shown in FIG. 1, the in-cylinder temperature is detected by the temperature detection element 21*a*, but the in-cylinder temperature may be estimated based on the in-cylinder pressure detected by the in-cylinder pressure sensor 21. Specifically, the in-cylinder temperature is estimated from the calculation using the in-cylinder pressure, the cylinder volume, the gas weight in the cylinder, and the gas constant.

Means and/or functions provided by the ECU 80 can be provided by software recorded on a substantive storage medium, computer executing the software, software only, hardware only, or a combination thereof. For example, when the lubricity estimation device and the combustion system control device are provided by a circuit that is hardware, they can be provided by a digital circuit or an analog circuit including many logic circuits.

Although the present disclosure has been described in accordance with embodiments, it is understood that the disclosure should not be limited to the embodiments and structures. The present disclosure encompasses various modifications and variations within the equivalent scope. In addition, various combinations and forms, as well as other combinations and forms including, in them, only one element, more than one, or less, are also within the scope and idea of the disclosure.

The invention claimed is:

1. A lubricity estimation device that is applied to a fuel supply system for supplying a fuel to an internal combustion engine, the lubricity estimation device comprising:
   a controller including a computer processor for executing instructions such that the controller is at least configured to estimate a mixing ratio of each of plural types of molecular structures contained in the fuel, which is to be supplied to the internal combustion engine;

calculate a lubrication index, representing lubricity provided to a sliding portion of the fuel supply system by the fuel, based on the estimate of the mixing ratio; and generate a signal corresponding to the lubrication index to control the fuel supply system.

2. The lubricity estimation device according to claim 1, wherein the controller calculates the lubrication index to be a value indicating that the lubricity is better as the mixing ratio of molecular structures that have a larger number of carbon atoms than an average number of carbon atoms of the plural types of molecular structures contained in the fuel becomes larger.

3. The lubricity estimation device according to claim 2, wherein the controller calculates the lubrication index by using at least the mixing ratio of the molecular structures of normal paraffins among the molecular structures each having a larger number of carbon atoms than the average number of carbon atoms.

4. The lubricity estimation device according to claim 2, wherein the controller calculates the lubrication index by using at least the mixing ratio of the molecular structures of isoparaffins among molecular structures each having a smaller number of carbon atoms than the average number of carbon atoms.

5. The lubricity estimation device according to claim 1, wherein the controller calculates the lubrication index to be a value indicating that the lubricity is better as the mixing ratio of molecular structures each having a cyclic carbon chain is larger.

6. The lubricity estimation device according to claim 5, wherein the controller calculates the lubrication index by using at least the mixing ratio of molecular structures of aromas among the molecular structures each having a cyclic carbon chain.

7. The lubricity estimation device according to claim 5, wherein the controller calculates the lubrication index by using at least the mixing ratio of molecular structures each having two or more of cyclic carbon chains among the molecular structures each having a cyclic carbon chain.

8. The lubricity estimation device according to claim 1, wherein the controller calculates the lubrication index to be a value indicating that the lubricity is better as the temperature of the fuel is lower.

9. A fuel supply control device that controls operation of a fuel supply system having a fuel injection valve that injects a fuel to be burned in an internal combustion engine and a fuel pump that pumps the fuel to the fuel injection valve, the fuel supply control device comprising:

a controller including a computer processor for executing instructions such that the controller is at least configured to estimate a mixing ratio of each of plural types of molecular structures contained in the fuel, which is to be supplied to the internal combustion engine;

calculate a lubrication index, representing lubricity provided to a sliding portion of the fuel supply system by the fuel, based on the estimate of the mixing ratio; and control the operation of the fuel supply system to reduce the workload of the fuel pump to protect the sliding portion when the lubricity becomes low as indicated by the lubrication index exceeding a predetermined threshold value.

10. The lubricity estimation device according to claim 1, wherein the controller is further configured to:

acquire a plurality of combustion property values each of which relates to combustion of fuel, wherein the estimate of the mixing ratio is based on the combustion property values in different combustion conditions.

11. The lubricity estimation device according to claim 10, wherein the combustion property values include at least one of:

an ignition delay time between a time point when fuel injection is commanded and a time point when the fuel self-ignites;

a waveform representing a heat generation rate that is a change in a heat amount per unit time; and a heat amount generated by combustion of fuel.

12. The lubricity estimation device according to claim 10, wherein the combustion conditions include at least one of an in-cylinder pressure, an in-cylinder temperature, an intake oxygen concentration, an injection pressure, and an air-fuel mixture flow velocity.

13. The lubricity estimation device according to claim 10, wherein the types of the molecular structures include at least one of normal paraffins, isoparaffins, naphthenes, and aromas.

14. The lubricity estimation device according to claim 9, wherein the controller is further configured to:

acquire a plurality of combustion property values each of which relates to combustion of fuel, wherein the estimate of the mixing ratio is based on the combustion property values in different combustion conditions.

15. The lubricity estimation device according to claim 14, wherein the combustion property values include at least one of:

an ignition delay time between a time point when fuel injection is commanded and a time point when the fuel self-ignites;

a waveform representing a heat generation rate that is a change in a heat amount per unit time; and a heat amount generated by combustion of fuel.

16. The lubricity estimation device according to claim 14, wherein the combustion conditions include at least one of an in-cylinder pressure, an in-cylinder temperature, an intake oxygen concentration, an injection pressure, and an air-fuel mixture flow velocity.

17. The lubricity estimation device according to claim 14, wherein the types of the molecular structures include at least one of normal paraffins, isoparaffins, naphthenes, and aromas.

18. The lubricity estimation device according to claim 1, wherein:

the controller is further configured to acquire an ignition delay time of the fuel;

the ignition delay time is a time between a timing at which powering of a fuel injection valve is started to inject the fuel and a timing at which combustion of the fuel is started; and the controller is further configured to estimate the mixing ratio based on the acquired ignition delay time.

19. The lubricity estimation device according to claim 18, wherein the controller is further configured to acquire a detection signal corresponding to an in-cylinder pressure that is a pressure in a combustion chamber of the internal combustion engine;

estimate a combustion start timing based on a change in the acquired detection signal; and calculate the ignition delay time based on the combustion start timing.

20. The lubricity estimation device according to claim 19, further comprising:

an in-cylinder pressure sensor configured to output the detection signal corresponding to the in-cylinder pressure.

21. The fuel supply control device according to claim 9, wherein:

the controller is further configured to acquire an ignition delay time of the fuel;

the ignition delay time is a time between a timing at which powering of a fuel injection valve is started to inject the fuel and a timing at which combustion of the fuel is started, and the controller is further configured to estimate the mixing ratio based on the acquired ignition delay time.

22. The fuel supply control device according to claim 21, wherein the controller is further configured to acquire a detection signal corresponding to an in-cylinder pressure that is a pressure in a combustion chamber of the internal combustion engine;

estimate a combustion start timing based on a change in the acquired detection signal; and calculate the ignition delay time based on the combustion start timing.

23. The fuel supply control device according to claim 22, further comprising:

an in-cylinder pressure sensor configured to output the detection signal corresponding to the in-cylinder pressure.

* * * * *